(12) United States Patent
Cordeiro et al.

(10) Patent No.: US 9,949,141 B2
(45) Date of Patent: *Apr. 17, 2018

(54) CLUSTERING MANAGEMENT IN MMWAVE WIRELESS SYSTEMS

(71) Applicant: Intel Corporation, Santa Clara, CA (US)

(72) Inventors: Carlos Cordeiro, Portland, OR (US); Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/541,635

(22) Filed: Nov. 14, 2014

(65) Prior Publication Data

US 2015/0071278 A1 Mar. 12, 2015

Related U.S. Application Data

(63) Continuation of application No. 12/824,413, filed on Jun. 28, 2010, now Pat. No. 8,913,550.

(Continued)

(51) Int. Cl.
| | |
|---|---|
| *H04W 16/24* | (2009.01) |
| *H04W 88/12* | (2009.01) |
| *H04W 16/14* | (2009.01) |
| *H04W 48/16* | (2009.01) |
| *H04W 28/04* | (2009.01) |

(Continued)

(52) U.S. Cl.
CPC ......... *H04W 16/24* (2013.01); *H04W 16/14* (2013.01); *H04W 48/16* (2013.01); *H04W 28/048* (2013.01); *H04W 74/006* (2013.01); *H04W 84/10* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 7,016,328 B2 | 3/2006 | Chari et al. | |
| 7,764,706 B2* | 7/2010 | Tavli | H04W 28/26 370/444 |

(Continued)

FOREIGN PATENT DOCUMENTS

| | | |
|---|---|---|
| CN | 1719931 A | 1/2006 |
| CN | 101507207 A | 8/2009 |

(Continued)

OTHER PUBLICATIONS

Kim, Joongheon, "Optimal Beaconing for 60 GHz Millimeter Wave", 2009, IEEE, pp. 1-2.*

(Continued)

*Primary Examiner* — Steve Young
(74) *Attorney, Agent, or Firm* — Schwegman Lundberg & Woessner, P.A.

(57) ABSTRACT

According to various embodiments, a method is disclosed that includes detecting if a first cluster capable PCP/AP is within range of a non-PCP/non-AP STA; and transmitting a message to a second cluster capable PCP/AP associated with the non-PCP/non-AP STA requesting that the second cluster capable PCP/AP start or continue the use of clustering in a basic service set (BSS) of the second cluster capable PCP/AP.

18 Claims, 2 Drawing Sheets

Related U.S. Application Data (60) Provisional application No. 61/304,974, filed on Feb. 16, 2010.

(51) Int. Cl.
  *H04W 84/10* (2009.01)
  *H04W 74/00* (2009.01)

(56) References Cited

U.S. PATENT DOCUMENTS

| | | | |
|---|---|---|---|
| 7,961,673 | B2 | 6/2011 | Jain |
| 8,170,503 | B2 | 5/2012 | Oh et al. |
| 8,189,526 | B2 | 5/2012 | Hsu et al. |
| 8,442,069 | B2 | 5/2013 | Ji et al. |
| 8,509,102 | B2 | 8/2013 | Krishnamurthy et al. |
| 8,553,628 | B2* | 10/2013 | Jin .................. H04L 5/0073 370/329 |
| 8,705,383 | B2* | 4/2014 | Liu .................. H04W 74/0816 370/252 |
| 8,730,838 | B2* | 5/2014 | Liang .................. H04W 84/18 370/254 |
| 8,913,550 | B2 | 12/2014 | Cordeiro et al. |
| 2003/0123405 | A1* | 7/2003 | del Prado ......... H04W 74/0816 370/331 |
| 2004/0053621 | A1 | 3/2004 | Sugaya |
| 2004/0255001 | A1 | 12/2004 | Oh et al. |
| 2006/0019673 | A1 | 1/2006 | Kengo et al. |
| 2006/0268767 | A1 | 11/2006 | Sato et al. |
| 2008/0112364 | A1 | 5/2008 | Kwon et al. |
| 2008/0247371 | A1 | 10/2008 | Kwon et al. |
| 2009/0028097 | A1* | 1/2009 | Patel .................. H04W 16/14 370/329 |
| 2009/0059815 | A1 | 3/2009 | Cheng et al. |
| 2009/0316625 | A1 | 12/2009 | Chen et al. |
| 2010/0027494 | A1 | 2/2010 | Kwon et al. |
| 2010/0046426 | A1 | 2/2010 | Shenoy et al. |
| 2010/0054179 | A1 | 3/2010 | Meyer |
| 2010/0128679 | A1 | 5/2010 | Kwon |
| 2010/0165963 | A1* | 7/2010 | Chu .................. H04L 12/43 370/338 |
| 2010/0182903 | A1 | 7/2010 | Paianki et al. |
| 2010/0315954 | A1* | 12/2010 | Singh .................. H04W 72/044 370/241 |
| 2010/0317388 | A1* | 12/2010 | Chu .................. H04L 5/0037 455/509 |
| 2011/0002297 | A1 | 1/2011 | Jain et al. |
| 2011/0007689 | A1 | 1/2011 | Shen et al. |
| 2011/0038357 | A1 | 2/2011 | Gong |
| 2011/0053582 | A1 | 3/2011 | Mueck et al. |
| 2011/0158198 | A1 | 6/2011 | Jeon et al. |
| 2011/0286349 | A1 | 11/2011 | Tee et al. |
| 2012/0033621 | A1 | 2/2012 | Mueck |

FOREIGN PATENT DOCUMENTS

| | | |
|---|---|---|
| CN | 102196470 B | 8/2016 |
| CN | 105933912 A | 9/2016 |
| EP | 2217010 A1 | 8/2010 |
| JP | 11-355840 | 12/1999 |
| JP | 2004080400 A | 3/2004 |
| JP | 2007-6019 | 1/2007 |
| JP | 5795023 B2 | 8/2015 |
| WO | WO-2009055973 A1 | 5/2009 |

OTHER PUBLICATIONS

Office Action dated Mar. 30, 2015 in corresponding Chinese Patent Application No. 201110087025.6, 7 pages.
Japanese Office Action, Patent Application No. 2011-024206, dated Jan. 22, 2013, total of 3 pages.
State Intellectual Property Office, P.R. China, Chinese Patent Application No. 2011100870256.6, 2nd Office Action, dated Feb. 18, 2014.
Japanese Office Action , Japanese Patent Application No. 2013-108118, dated Aug. 26, 2014.
Chinese Office Action, Chinese Patent Application No. 2011100870256.6 dated Aug. 21, 2014.
International Search Report and Written Opinion, dated Oct. 28, 2011, for International Application No. PCT/US2011/023442.
"U.S. Appl. No. 12/824,413, Advisory Action dated Jul. 2, 2013", 3 pgs.
"U.S. Appl. No. 12/824,413, Applicant's Summary of Examiner Interview filed Jul. 19, 2013", 1 pg.
"U.S. Appl. No. 12/824,413, Examiner interview Summary dated Jul. 15, 2013", 3 pgs.
"U.S. Appl. No. 12/824,413, Final Office Action dated Mar. 19, 2013", 20 pgs.
"U.S. Appl. No. 12/824,413, Final Office Action dated Apr. 10, 2014", 18 pgs.
"U.S. Appl. No. 12/824,413, Non Final Office Action dated Aug. 3, 2012", 11 pgs.
"U.S. Appl. No. 12/824,413, Non Final Office Action dated Sep. 13, 2013", 19 pgs.
"U.S. Appl. No. 12/824,413, Notice of Allowance dated Aug. 15, 2014", 7 pgs.
"U.S. Appl. No. 12/824,413, Notice of Allowance dated Oct. 3, 2014", 4 pgs.
"U.S. Appl. No. 12/824,413, Response filed Jun. 19, 2013 to Final Office Action dated Mar. 19, 2013", 16 pgs.
"U.S. Appl. No. 12/824,413, Response filed Jul. 8, 2014 to Final Office Action dated Apr. 10, 2014", 18 pgs.
"U.S. Appl. No. 12/824,413, Response filed Dec. 3, 2012 to Non Final Office Action dated Aug. 3, 2012", 14 pgs.
"U.S. Appl. No. 12/824,413, Response filed Dec. 13, 2013 to Non Final Office Action dated Sep. 13, 2013", 19 pgs.
"Chinese Application Serial No. 201110087025.6, Decision to Grant dated May 18, 2016", W/ English Translation, 3 pgs.
"Chinese Application Serial No. 201110087025.6, Office Action dated Feb. 18, 2014", w/ English Translation, 20 pgs.
"Chinese Application Serial No. 201110087025.6, Office Action dated Mar. 30, 2015", w/ English Translation, 7 pgs.
"Chinese Application Serial No. 201110087025.6, Office Action dated Jul. 1, 2013", w/ English Translation, 22 pgs.
"Chinese Application Serial No. 201110087025.6, Office Action dated Aug. 21, 2014", w/ English Translation, 18 pgs.
"Chinese Application Serial No. 201110087025.6, Office Action dated Oct. 13, 2015", w/ English Translation, 7 pgs.
"Chinese Application Serial No. 201110087025.6, Response filed Feb. 26, 2016 to Office Action dated Oct. 13, 2015", (English Translation of Claims), 9 pgs.
"Chinese Application Serial No. 201110087025.6, Response filed May 5, 2014 to Office Action dated Feb. 18, 2014", w/ English Translation, 10 pgs.
"Chinese Application Serial No. 201110087025.6, Response filed Jun. 15, 2015 to Office Action dated Mar. 30, 2015", w/ English Claims, 8 pgs.
"Chinese Application Serial No. 201110087025.6 Response filed Nov. 5, 2014 to Office Action dated Aug. 21, 2014", w/ English Translation, 7 pgs.
"Chinese Application Serial No. 201110087025.6, Response filed Nov. 15, 2013 to Office Action dated Jul. 1, 2013", w/ English Translation, 7 pgs.
"European Application Serial No. 11745036.1, Response filed Mar. 22, 2013 to Communication pursuant to Rules 161(1) and 162 EPC dated Sep. 25, 2012", 11 pgs.
"European Application Serial No. 11745036.1, Extended European Search Report dated Mar. 7, 2017", 8 pgs.

\* cited by examiner

| | Element ID | Length | Cluster report control | Reference Timestamp | PCP/AP Clustering Control | Extended Schedule Element | TSCONST |
|---|---|---|---|---|---|---|---|
| | 305 | 310 | 315 | 320 | 325 | 330 | 335 |
| Octets: | 1 | 1 | 1 | 4 | 8 | 15-255 | Variable |

| Cluster request | Cluster report | Schedule present | TSCONST present | Reserved |
|---|---|---|---|---|
| 405 | 410 | 415 | 420 | 425 |
| Bits: 1 | 1 | 1 | 1 | 4 |

CLUSTERING MANAGEMENT IN MMWAVE WIRELESS SYSTEMS

CROSS REFERENCE TO RELATED APPLICATIONS

This application is a continuation of U.S. patent application Ser. No. 12/824,413 filed on Jun. 28, 2010, now U.S. Pat. No. 8,913,550, which claims benefit under 35 U.S.C. § 119(e) from U.S. Provisional Application No. 61/304,974 filed on Feb. 16, 2010, both of which are incorporated herein by reference in their entirety.

FIELD

This disclosure relates generally to the field of wireless communication, and in particular to clustering management in mmWave wireless systems.

BACKGROUND

In a typical wireless network, many devices can communicate with each other. To facilitate communications between multiple networkable devices, communications must be managed. Thus, each network typically has a communications controller such as an access point, a piconet controller (PNC), a PBSS central point (PCP) or a station (STA) that acts as a controller to manage network communication. A PNC can be defined as a controller that shares a physical channel with one or more stations where the PNC and stations form a network. Each station, such as a personal computer, can associate with the controller and thereby associate with the network. Associating with the network can include connecting to the network. Getting authorized by the network and gaining access to resources that are available via the network connection. Stations and network controllers typically utilize a network interface card (NIC) to handle the association process and to facilitate communication between the network devices. To increase system efficiency, some wireless networks utilize omni-directional transmissions for the association process and directional transmissions for data exchange.

Many wireless networks utilize a frequency of 2.4 GHz for communicating, as defined by the Institute of Electrical and Electronics Engineers ((IEEE)) 802.11b and g specifications. Other wireless networks utilize a frequency of 5 GHz for communicating as defined by the IEEE 802.11a specification. IEEE 802.11a and b were published in 1999, and IEEE 802.11g was published in 2003. Due to the number of networks, and crowded airways in these frequency ranges, additional wireless networks standards are being defined where such networks can communicate utilizing millimeter waves producing frequencies of around 60 GHz. With such high frequencies, directional communications are being considered to achieve acceptable performance for the expected link budget requirements.

The network controller can be configured to receive, via multiple spatially apart antenna elements, combined signals simultaneously transmitted from a plurality of STAs and separate the received signals into independent signals from each STA through appropriate signal processing. Also, the network controller may transmit directional radio signals via multiple spatially apart antenna elements towards intended STAs to suppress interference and increase signal-to-noise ratio.

Coexistence, whether with networks of the same type or different type, is a subject of growing attention and concern in unlicensed wireless systems. The PCP/AP clustering scheme in the WiGig specification and IEEE 802.11ad draft standard addresses this problem for the 60 GHz band, which will be particularly important in dense environments such as in enterprises.

Currently, there are no existing methods that allow non-PCP/non-AP STAs to report on the existence of other overlapping BSSs, including their characteristics such as scheduling information. This is particularly the case in 60 GHz technologies, where such feature may be important. Moreover, there are no existing methods that allow non-PCP/non-AP STAs to request their PCP/AP to enable PCP/AP clustering in their own BSS.

Given the above problem, improvements in the coexistence of overlapping BSSs and hence a better user experience when employing 60 GHz-based wireless systems is needed.

DETAILED DESCRIPTION

Definitions

Access Point (AP): Any entity that has a station (STA) functionality and provides access to the distribution services, via the WM for associated STAs.

Basic Service Set (BSS): A set of stations (STAs) that have successfully synchronized using the JOIN service primitives and one STA that has used the START primitive. Membership in a BSS does not imply that wireless communication with all other members of the BSS is possible.

Beacon Interval (BI): A beacon interval represents the amount of time between beacon transmissions. For example, before a station (STA) enters power save mode, the station (STA) needs the beacon interval (BI) to know when to wake up to receive the beacon (and learn whether there are buffered frames at the access point (AP)).

Beacon Frame: A Beacon frame is one of the management frames in IEEE 802.11 based WLANs. It contains all the information about the network. Beacon frames are transmitted periodically to announce the presence of a Wireless LAN network. Beacon frames are transmitted by the Access Point (AP) in an infrastructure BSS. In IBSS network beacon generation is distributed among the stations. For example, a Beacon frame can include a MAC header, Frame body and FCS and have fields including a timestamp field, a beacon interval field which is a time-interval between beacon transmissions, and capability information field which can span 16 bits and contain information about capability of the device/network.

Beacon Time (BT): The time interval between the start of the first mmWave Beacon transmission by an mSTA in a beacon interval to the end of the last mmWave Beacon transmission by the mSTA in the same beacon interval.

Contention-based period (CBP): a period of time during which STAs can contend for access to the shared wireless medium.

Frame: A basic unit for data transmission between stations. "Frame" is interchangeably used with "packet".

mmWave STA (mSTA): A STA whose radio transmitter is operating on a channel that is within the ultra band (UB) or 66 GHz frequency band.

Non-PCP/non-AP station (STA): a STA that is neither an AP nor a PCP.

Non-access-point (non-AP) station (STA): A STA that is not also an AP.

PBSS control point (PCP): Any entity that has station (STA) functionality and has received a START.confirm with a return code of SUCCESS in response to the transmission of a START.request with BSSType parameter set to "PBSS."

PCP/AP clustering allows a PCP/AP that is a member of a cluster to schedule transmissions in nonoverlapping time periods with respect to other members of the same cluster, since the PCP/AP can receive mmWave Beacon and Announce frames containing the Extended Schedule element of other cluster members.

Service Period (SP): a period of time during which only specified STAs can transmit. Transmission within an SP is initiated by the owner of the SP.

Station (STA): Any device that contains an IEEE 802.11-conformant medium access control (MAC) and physical layer (PHY) interface to the wireless medium (WM).

Wireless medium (WM): The medium used to implement the transfer of protocol data units (PDUs) between peer physical layer (PHY) entities of a wireless local area network (LAN).

A Personal Basic Service Set (PBSS) can be used to support mmWave usages. The PBSS can include a STA configured to operate as a network coordinator or a PCP (PBSS central point) which can facilitate directionality in mmWwave or higher frequencies networks, such as networks operating at or near 60 GHz. A PCP can be replaced with an AP and an PCP/AP may use the PCP/AP clustering mechanism to improve spatial frequency sharing and interference mitigation with other co-channel BSSs. PCP/AP clustering allows a PCP/AP that is a member of a cluster to schedule transmissions in non-overlapping time periods with respect to other members of the same cluster, since the PCP/AP can receive mmWave Beacon and Announce frames containing the Extended Schedule element of other cluster members.

Description

In accordance with some aspects of the present disclosure, a method is disclosed that includes detecting if a first cluster capable PCP/AP is within range of a non-PCP/non-AP STA; and transmitting a message to a second cluster capable PCP/AP associated with the non-PCP/non-AP STA requesting that the second cluster capable PCP/AP start or continue the use of clustering in the basic service set (BSS) of the second cluster capable PCP/AP and the non-PCP/non-AP STA.

In accordance with the method, the detecting can include receiving a beacon frame, such as a mmWave beacon frame, from the first cluster capable PCP/AP. The message can include a cluster report element having a cluster request subfield and the message can include a timing of when the detection occurred, information within the received beacon frame, or both. The cluster request subfield can be set to one to indicate that the non-PCP/non-AP STA is requesting that the second cluster capable PCP/AP start or continue PCP/AP clustering.

The method can include transmitting the cluster report element in an announce frame or an information response frame to the second cluster capable PCP/AP. Moreover, the method can include determining whether to transmit the message from the non-PCP/non-AP STA by determining if the beacon frame originated from the second cluster capable PCP/AP. Further, the method can include determining whether to transmit the message from the non-PCP/non-AP STA by determining if the beacon frame includes a PCP/AP clustering control field. Still further, the method can include determining whether to transmit the message from the non-PCP/non-AP STA by determining if a value of a cluster ID field within the PCP/AP clustering control field is different than a MAC address of the second cluster capable PCP/AP. Further, the method can include initializing another co-channel basic service set (BSS) in which the non-PCP/non-AP STA is configured to function as a PCP/AP and become a member PCP/AP of a cluster enabled by the second cluster capable PCP/AP.

In accordance with some aspects of the present disclosure, an apparatus is disclosed that includes a receiver configured to detect if a first cluster capable PCP/AP is within range of a non-PCP/non-AP STA; and a transmitter configured to transmit a message to second cluster capable PCP/AP associated with the non-PCP/non-AP STA requesting that the second cluster capable PCP/AP start or continue the use of clustering in the basic service set (BSS) of the second cluster capable PCP/AP and the non-PCP/non-AP STA.

In accordance the apparatus, the receiver can be configured to receive a beacon frame, such as a mmWave beacon frame, from the first cluster capable PCP/AP. The message can include cluster report element and can include a timing of when the detection occurred, information within the received beacon frame, or both. The apparatus can include a controller configured to determine whether to transmit the message from the non-PCP/non-AP STA by determining if the beacon frame originated from the second cluster capable PCP/AP. Moreover, the apparatus can include a controller configured to determine whether to transmit the message from the non-PCP/non-AP STA by determining if the beacon frame includes a PCP/AP clustering control field. The controller can determine whether to transmit the message from the non-PCP/non-AP STA by determining if a value of a cluster ID field within the PCP/AP clustering control field is different than a MAC address of the second cluster capable PCP/AP.

In accordance with some aspects of the present disclosure, a method is disclosed that includes receiving a request from a non-PCP/non-AP STA at a first PCP/AP to enable or continue clustering at a basic service set (BSS) of the first PCP/AP, wherein the first PCP/AP is not associated with a basic service set (BBS) of a second PCP/AP that is operating in the vicinity of the basic service set (BSS) of the first PCP/AP.

The method can include receiving an extended schedule element from the second PCP/AP to schedule a service period, a contention-based period in a beacon interval, or both, and/or move a beacon time.

The method can further include a service period in the beacon interval with a predefined source and destination assigned association identifier (AID) to prevent transmissions during specific periods in the beacon interval.

The method can include receiving a cluster report element in an announce frame or an information response frame from the non-PCP/non-AP STA; setting a cluster report subfield of the cluster report element to one; setting a PCP/AP clustering control field within a transmitted cluster report element to the corresponding field values within the PCP/AP clustering control field of a received beacon frame; setting a reference timestamp field to indicate a beacon frame reception time; setting a schedule present subfield to one if an extended schedule field is present in a transmitted cluster report element; and setting a TSCONST present subfield to one if a TSCONST field is present in the transmitted cluster report element.

The method can further include setting an extended schedule element field within the cluster report element to a corresponding field value within an extended schedule element of a received beacon frame.

The method can further include setting the TSCONST field to indicate a period of time with respect to a target beacon transmit time (TBTT) of the beacon interval (BI) of the basic service set (BSS) of the second PCP/AP if the non-PCP/non-AP STA experiences poor channel conditions including interference.

The method can further include scheduling a service period and a contention-based period in a beacon interval (BI) upon receiving a cluster report element from the non-PCP/non-AP STA with the cluster report field set to one by the non-PCP/non-AP STA, or first PCP/AP, or second PCP/AP.

The method can further include creating a service period (SP) in the beacon interval (BI) with a source and destination assigned association identifier (AID) set to a predefined value to prevent transmissions during specific periods in the beacon interval (BI).

In accordance with some aspects of the present disclosure, an apparatus is disclosed that includes a receiver of a first PCP/AP configured to receive a request from a non-PCP/non-AP STA to start or continue use of clustering at a basic service set (BSS) of the first PCP/AP, wherein the first PCP/AP is not associated with a basic service set (BBS) of a second PCP/AP that is operating in the vicinity of the basic service set (BSS) of the first PCP/AP.

In the apparatus, the receiver can receive an extended schedule element from the second PCP/AP to schedule a service period, a contention-based period in a beacon interval, or both, and/or move a beacon time. The apparatus can further include a controller configured to create a service period in a beacon interval with a predefined source and destination assigned association identifier (AID) to prevent transmissions during a predetermined period in the beacon interval.

The following is a detailed description of embodiments depicted in the accompanying drawings. Arrangements in the form of systems, apparatuses, methods and computer readable media are disclosed herein that can provide efficient communication between a network communication controller (NCC) and stations in a wireless network. Such communications are referred to herein as intra-network communications. Intra-network communications can include beacon transmissions and data transmissions. In addition, arrangements in the form of systems, apparatuses, methods and computer readable media are disclosed herein that can provide efficient communication between multiple NCCs in range of each and such communications can manage and/or synchronize channel usage among different networks. Such management, synchronization and communications are referred to as inter-network management, synchronization, and communications. These communications generally only include beacon transmissions as typically no data (other than synchronization data) is transmitted among networks. Such inter-network activities can create a synchronized area or synchronized domain. In some embodiments, the NCC can be a piconet controller, an access point, a PBSS central point (PCP), a station or any device that can provide management commands to control intra or inter-network communications.

A PCP/AP may use the PCP/AP clustering mechanism to improve spatial frequency sharing and interference mitigation with other co-channel BSS. PCP/AP clustering allows a PCP/AP that is a member of a cluster to schedule transmissions in non-overlapping time periods with respect to other members of the same cluster, since the PCP/AP can receive mmWave Beacon and Announce frames containing the Extended Schedule element of other cluster members. The PCP/AP can employ the PCP/AP Clustering Control field to configure the use of PCP/AP Clustering in a BSS. A PCP/AP that transmits the Clustering Control field is defined as "clustering enabled" and a PCP/AP that does not transmit the Clustering Control field is defined as "clustering disabled." Clustering enabled PCP/APs can operate on the same channel and may form a PCP/AP cluster. A PCP/AP cluster can include one Synchronization PCP/AP (S-PCP/S-AP) and zero or more member PCP/APs. The MAC address of the S-PCP/S-AP can be the ClusterID of the PCP/AP cluster.

As discussed above, the conventional PCP/AP clustering mechanism defined in the WiGig specification and IEEE 802.11ad draft standard has at least two limitations. First, non-PCP/non-AP stations (STAs) cannot report on the existence of overlapping BSSs that they detect. The existing clustering assumes that the PCP/AP is the only STA that can detect overlapping BSSs, while other non-PCP/non-AP STAs cannot report to their own PCP/AP should they detect an overlapping BSS. This tends to limit the potential for coexistence to only those BSSs which have PCPs/APs in direct communication range. Second, non-PCP/non-AP STAs cannot request their PCP/AP to enable clustering in their BSS if clustering is not yet enabled in the BSS. That is, currently the decision to enable PCP/AP clustering belongs to the PCP/AP only.

In accordance with some aspects of the present disclosure, an extension to the clustering mechanism is disclosed that will enable it to overcome the two above-described problems. To address the first problem related to the reporting on the existence of overlapping BSSs, a Cluster Report and Re-Scheduling mechanism is disclosed that can allow non-PCP/non-AP STAs to report not only the existence of an overlapping BSS, but also to report the timing of when the detection occurred and, if available, specific information within the detected beacon that can promote a better coexistence between the overlapping BSSs. To address the second problem related to the requesting of clustering, a non-PCP/non-AP STA can be arranged to explicitly request its PCP/AP to enable clustering in its BSS. This will assist the decision process at the PCP/AP to enable or not clustering and hence possibly improve the overlapping BSS operation.

Figure 1:
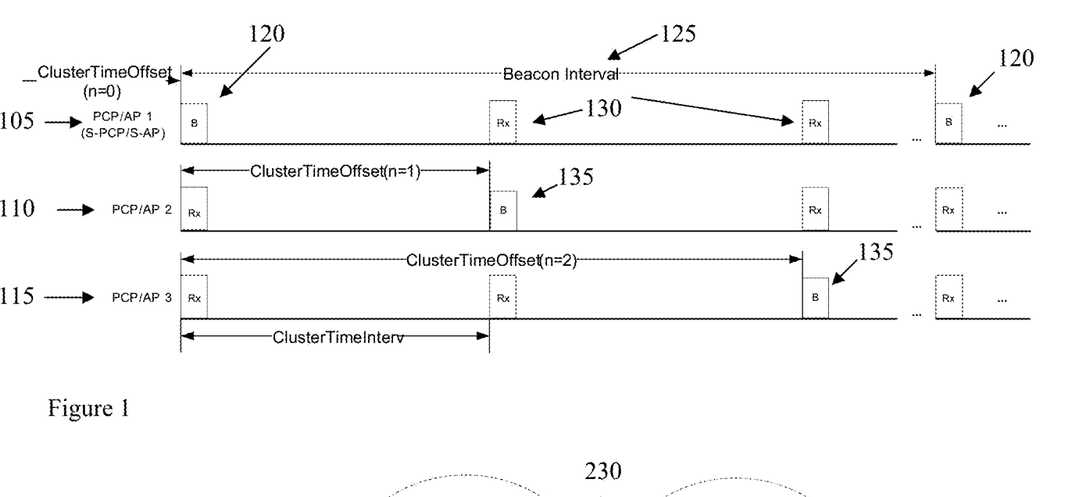
FIG. 1 illustrates, for three PCP/APs, an example of PCP/AP Clustering.

FIG. 1 illustrates, for three PCP/APs, an example of PCP/AP Clustering. Clustering allows the alignment of the beacon intervals (BIs) of different BSSs and, once that is done, PCPs/APs can receive the scheduling information from each other and re-schedule their transmissions accordingly. In the figure, the transmission of beacons from different NCCs, for example, but not limited to, S-PCP/S-AP, PCP/AP on the same channel or on a single channel. In such a configuration a NCC can transmit the standard or synchronization beacon (SB) in a single time slot or in adjacent time slots. Thus, each NCC's beacon can be communicated in a time-division manner or the beacons can be staggered in time. Turning to the FIG. 1, a S-PCP/S-AP 105 can transmit a beacon frame 120 each beacon interval 125. A first receiving PCP/AP 110 can listen and receive the beacon frame 120 transmitted by the S-PCP/S-AP 105 during a receiving interval Rx 130. The PCP/AP 110 can also transmit another beacon frame 135 after a predetermined time interval, such as offset time 1, labeled "ClusterTimeOffset (n=1)" in the figure. Similarly, a second receiving PCP/AP 115 can transmit a beacon frame 135 after waiting a predetermined time interval, such as offset time 2, labeled "ClusterTimeOffset(n=2)" in the figure. Thus, each PCP/AP can be assigned a different offset from the start of the beacon frame from S-PCP/S-AP and each PCP/AP can start transmission of its beacon frame based on its assigned offset. The two PCP/APs as described and illustrated are merely illustrative, and more or less PCP/APs may be a part of the cluster with a given S-PCP/SAP.

Figure 2:
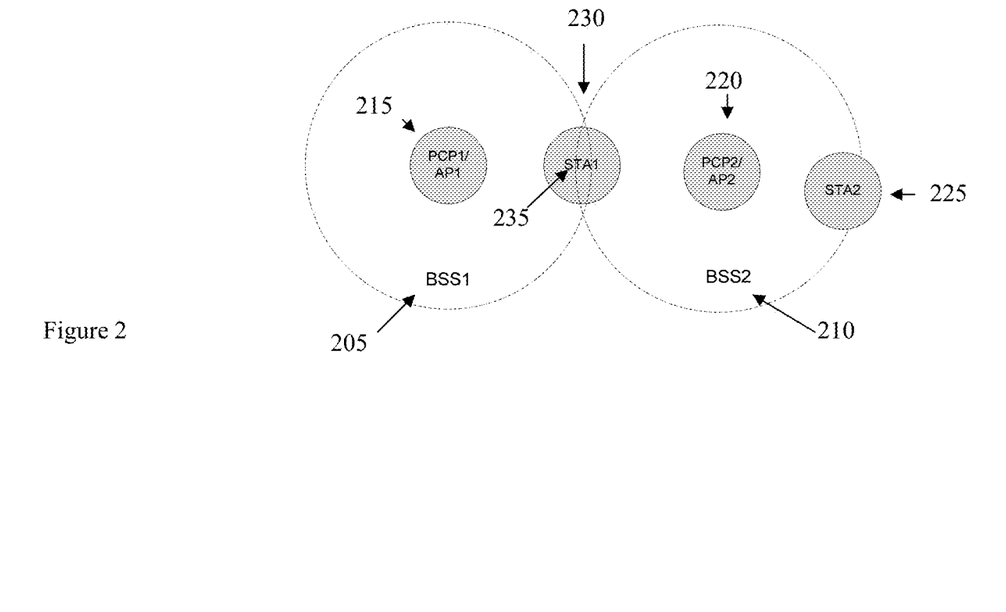
FIG. 2 is an example of the PCP/AP clustering mechanism in accordance with various aspects of the present disclosure.

FIG. 2 illustrates an example of the PCP/AP clustering mechanism in accordance with some aspects of the present disclosure. Two PCP/APs, in particular PCP1/AP1 215 and PCP2/AP2 220 are arranged such that their range of their respective areas of influence, represented by the dotted line, overlap at region 230. STA 2 225 is clustered with PCP2/AP2 220, but is not in range and is not clustered with PCP1/AP1 215. STA 1 235 is clustered with PCP1/AP1 215 and is arranged such that it is able to be in both the BSS1 205 associated with PCP1/AP1 215 and BSS2 210 associated with PCP2/AP2 220. If the STA 1 235 detects a beacon from PCP2/AP2 and realizes that PCP2/AP2 is using clustering in BSS2 210, STA 1 235 can request PCP1/AP1 215 to enable PCP/AP clustering in BSS1 205. This process is described further below with regard to the information element shown in FIGS. 3 and 4. By doing so, an improvement in the coexistence between BSS1 and BSS2 can be achieved.

Figure 3:
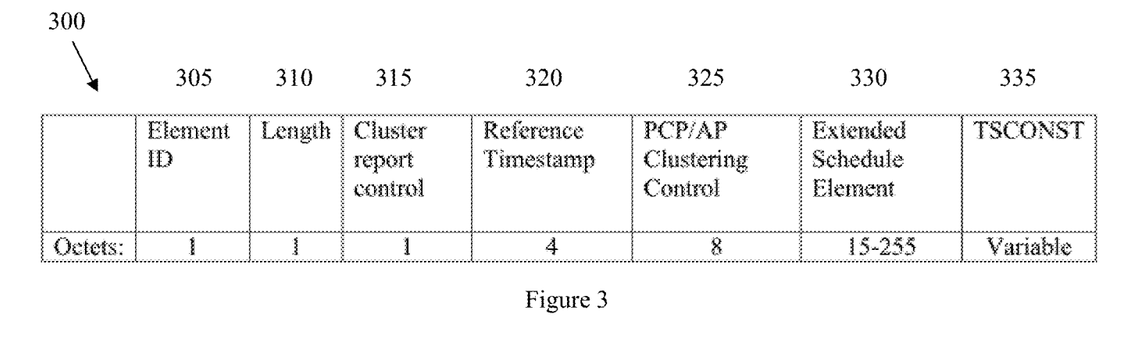
FIG. 3 is an example Cluster Report element in accordance with various aspects of the present disclosure.
Figure 4:
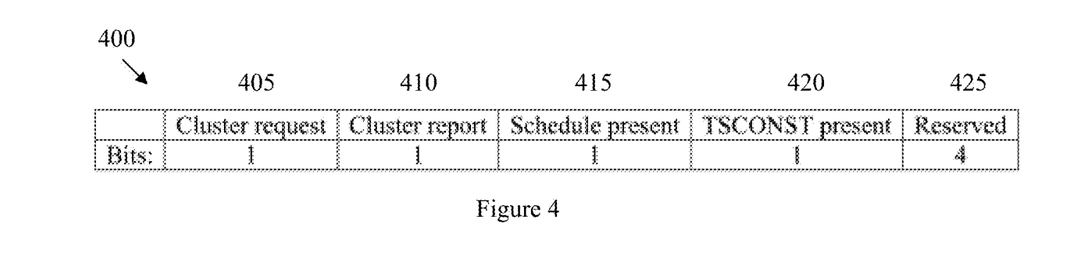
FIG. 4 is an example Cluster report control field of the Cluster Report element of FIG. 3.

FIG. 3 is an example Cluster Report element 300 in accordance with various aspects of the present disclosure. FIG. 4 is an example Cluster report control field 400 of the Cluster Report element 300 of FIG. 3. The Cluster request subfield 405 can be set to one to indicate that the STA is requesting the PCP/AP to start or continue PCP/AP clustering and this field can be ignored when set to zero. The Cluster report subfield 410 can be set to one to indicate that this element contains a cluster report. If the Cluster report subfield 410 is set to one, the Reference Timestamp 320 and PCP/AP Clustering Control fields 325 are present in this element. Otherwise if the Cluster report subfield 410 is set to zero, none of the Reference Timestamp 320, PCP/AP Clustering Control 325, Extended Schedule Element 330 and TSCONST fields 335 are present in this element.

The Schedule present subfield 415 is valid only if the Cluster report subfield 410 is set to one, otherwise it is ignored. The Schedule present subfield 415 is set to one to indicate that the Extended Schedule Element field 330 is present in this element. Otherwise, the Extended Schedule Element field 330 is not present in this element. The Extended Schedule element 330 contains all the allocations in the beacon interval (BI), and enables coexistence between overlapping BSSs.

The TSCONST present subfield 420 is valid only if the Cluster report subfield 410 is set to one, otherwise it is ignored. The TSCONST present subfield 420 is set to one to indicate that the TSCONST field is present in this element. Otherwise, the TSCONST field is not present in this element.

By using the Cluster report element 300 and the Cluster report control field 400, a cluster capable PCP/AP that receives an Extended Schedule element from another cluster capable PCP/AP may re-schedule service periods (SPs) and contention-based periods (CBPs) in its beacon interval (BI), or move the beacon time (BT), in an attempt to mitigate any interference with the transmissions indicated in the received Extended Schedule element. The PCP/AP may also create SPs in its BI and set the source and destination AID fields of the SP set to the AID of the PCP/AP itself. By doing this, the PCP/AP can prevent STAs from transmitting during specific periods in the BI.

A non-PCP/non-AP STA that is a member of a BSS and that receives a mmWave Beacon can send a Cluster Report element to its PCP/AP if the received mmWave Beacon frame meets certain conditions. For example, the mmWave Beacon is not from the STA's own PCP/AP, the mmWave Beacon contains the PCP/AP Clustering Control field, and/or the value of the Cluster ID field within the PCP/AP Clustering Control field is different than the MAC address of the STA's PCP/AP.

A Cluster Report element meeting some or all of the conditions above can be transmitted in an Announce or Information Response frame sent to the STA's PCP/AP. Within the transmitted Cluster Report element, the STA can set the Cluster report subfield to one. The STA can set the PCP/AP Clustering Control field within a transmitted Cluster Report element to the corresponding field values within the PCP/AP Clustering Control of the received mmWave Beacon, and can set the Reference timestamp field to indicate the mmWave Beacon reception time. The STA can set the Schedule present subfield to one if the Extended Schedule field is present in the transmitted Cluster Report element, otherwise it can set Schedule present subfield to zero. The STA can set the TSCONST present subfield to one if the TSCONST field is present in the transmitted Cluster Report element, otherwise it can set TSCONST subfield to zero. If present, the Extended Schedule Element field within the Cluster Report element can be set to the corresponding field values within the Extended Schedule element of the received mmWave Beacon. If present, the TSCONST field can be set to indicate periods of time with respect to the start of the BI of the BSS the STA participates where the transmitting STA experiences poor channel conditions, such as due to interference.

Upon receiving a Cluster Report element from a non-PCP/non-AP STA with the Cluster report field set to one, a clustering capable PCP/AP may re-schedule SPs and CBPs in its BI, or move the BT, or perform other actions, in an attempt to mitigate any interference with the transmissions indicated in the received Cluster Report element. The cluster capable PCP/AP may also create SPs in its BI and set the source and destination AID fields of the SP to the AID of the PCP/AP itself. By doing this, the PCP/AP can prevent STAs from transmitting during specific periods in the BI.

Moreover, by using the Cluster report element 300 and the Cluster report control field 400, a non-PCP/non-AP STA that is a member of a BSS may transmit a Cluster Report element to its PCP/AP to request that PCP/AP clustering be enabled in the BSS. The non-PCP/non-AP STA can make this request if, for example, the non-PCP/non-AP STA intends to initialize another co-channel BSS in which it will perform the role of PCP/AP and, when performing this role, it wishes to become a member PCP/AP of the cluster enabled by its current PCP/AP.

To request PCP/AP clustering to be enabled in the BSS, the STA can transmit a Cluster Report element with the Cluster request subfield set to one to its PCP/AP. Upon receiving a Cluster Report element with the Cluster request subfield set to one, the PCP/AP can form and maintain PCP/AP clustering in the BSS according to the conventional procedures, such as the procedures in the WiGig specification and IEEE 802.11ad draft standard. In doing that, the PCP/AP can set the minimum duration of the Beacon SP to be equal to a minimum predetermined time interval. For example, but not limited to, the minimum time interval may be 500 µs.

If the non-PCP/non-AP does not receive a mmWave Beacon frame from its PCP/AP with PCP/AP clustering enabled after the minimum time interval following the transmission to its PCP/AP of a Cluster Report element with the Cluster request subfield set to one, the non-PCP/non-AP STA may retransmit a Cluster Report element to its PCP/AP to request that PCP/AP clustering be enabled in the BSS.

If a non-PCP/non-AP STA becomes a member PCP/AP of the cluster enabled by its current PCP/AP, the non-PCP/non-AP STA can synchronize scheduled CBP allocations, if any, between the BSS in which it performs the role of PCP/AP and the BSS of its current PCP/AP.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method comprising:
   determining, by a station (STA) associated with a first personal basic service set (PBSS), whether the first PBSS and a second PBSS are overlapping based on a beacon frame from the second PBSS; and
   responsive to a determination that the first PBSS and the second PBSS are overlapping, generating, at the STA, a message based on information within the beacon frame;
   wherein:
      a first portion of the message indicates a request to a first PBSS control point (PCP) of the first PBSS to start use of an IEEE 802.11ad clustering scheme in the first PBSS that allows the first PCP to schedule transmissions in non-overlapping time periods with respect to other members of the same cluster; and
      the first portion of the message to the first PCP allows the first PCP to schedule transmissions in non-overlapping time periods with respect to members associated with the second PBSS or create a specific time period including moving a beacon time interval (BTI) associated with the first PBSS in order to mitigate interference with transmissions of the second PBSS;
   wherein:
      the STA is a non-access point STA (non-AP STA); and
      the method further comprises transmitting the message from the STA to the first PCP in an announce or information response frame.

2. The method of claim 1, wherein said determining includes receiving the beacon frame at the STA, and wherein the message includes timing information of the reception of the beacon frame at the STA.

3. The method of claim 1, wherein the message includes at least some of the information within the beacon frame.

4. The method of claim 1, wherein said generating is performed based at least on a determination that the beacon frame is associated with a PCP other than the PCP of the first PBSS.

5. The method of claim 1, wherein the beacon frame is an mmWave beacon frame and comprises a directional transmission.

6. The method of claim 1, wherein the STA and the PCP of the first PBSS are configured to communicate wirelessly using frequencies of around 60 GHz.

7. An apparatus comprising: a memory unit; and a processor comprising hardware to:
   determine whether a first personal basic service set (PBSS) and a second PBSS are overlapping based on a beacon frame from the second PBSS;
   wherein:
      the apparatus is configured as a station (STA) in the first PBSS;
      the STA is a non PBSS control point (PCP) non-access point STA (non-PCP non-AP STA);
      responsive to a determination that the first PBSS and the second PBSS are overlapping; the apparatus is configured to generate a message based on information within the beacon frame;
   wherein:
      a first portion of the message indicates a request to a first PBSS control point (PCP) of the first PBSS to start use of an IEEE 802.11ad clustering scheme in the first PBSS that allows the first PCP to schedule transmissions in non-overlapping time periods with respect to other members of the same cluster; and
      the first portion of the message to the first PCP allows the first PCP to schedule transmissions in non-overlapping time periods with respect to members associated with the second PBSS or create a specific time period including moving a beacon time interval (BTI) associated with the first PBSS in order to mitigate interference with transmissions of the second PBSS;
   the apparatus further comprises a radio transmitter configured to transmit the message to the first PCP.

8. The apparatus of claim 7, further comprising a receiver to receive the beacon frame, wherein the message includes timing information of the reception of the beacon frame at the receiver.

9. The apparatus of claim 7, wherein the message includes at least some of the information within the beacon frame.

10. The apparatus of claim 7, wherein the processor is to generate the message based at least on a determination that the beacon frame is associated with an PCP other than the PCP of the first PBSS.

11. The apparatus of claim 7, wherein the beacon frame is an mmWave beacon frame and comprises a directional transmission.

12. The apparatus of claim 7, wherein the apparatus and the PCP of the first PBSS are configured to communicate wirelessly using frequencies of around 60 GHz.

13. A non-transitory computer-readable storage medium that contains instructions, which when executed, configure one or more processors to:
   determine, by a station (STA) associated with a first personal basic service set (PBSS), whether the first PBSS and a second PBSS are overlapping based on a beacon frame from the second PBSS; and
   responsive to a determination that the first PBSS and the second PBSS are overlapping,
      generate, at the STA, a message based on information within the beacon frame;
wherein:
   a first portion of the message indicates a request to a first PBSS control point (PCP) of the first PBSS to start use of an IEEE 802.11 ad clustering scheme in the first PBSS that allows the first PCP to schedule transmissions in non-overlapping time periods with respect to other members of the same cluster;
   the first portion of the message to the first PCP allows the first PCP to schedule transmissions in non-overlapping time periods with respect to members associated with the second PBSS or create a specific time period including moving a beacon time interval (BTI) associated with the first PBSS in order to mitigate interference with transmissions of the second PBSS;
   the STA is a non-access point STA (non-AP STA); and
   the operations are further configured to transmit the message from the STA to the first PCP.

14. The computer-readable storage medium of claim 13, wherein the determination includes receipt of the beacon frame at the STA, and wherein the message includes timing information of the reception of the beacon frame at the STA.

15. The computer-readable storage medium of claim 13, wherein the message includes at least some of the information within the beacon frame.

16. The computer-readable storage medium of claim 13, wherein the beacon frame is an mmWave beacon frame and comprises a directional transmission.

17. The computer-readable storage medium of claim 13, wherein the STA and the PCP of the first PBSS are configured to communicate wirelessly using frequencies of around 60 GHz.

18. The computer-readable storage medium of claim 13 wherein during the use of clustering, transmissions are scheduled in non-overlapping time periods with respect to other PCPs of the cluster.

* * * * *

UNITED STATES PATENT AND TRADEMARK OFFICE
CERTIFICATE OF CORRECTION

PATENT NO. : 9,949,141 B2
APPLICATION NO. : 14/541635
DATED : April 17, 2018
INVENTOR(S) : Cordeiro et al.

Page 1 of 1

It is certified that error appears in the above-identified patent and that said Letters Patent is hereby corrected as shown below:

In the Claims

In Column 10, Line 45, in Claim 7, delete "overlapping;" and insert --overlapping,-- therefor Signed and Sealed this
Twenty-eighth Day of May, 2019

Andrei Iancu
*Director of the United States Patent and Trademark Office*